United States Patent [19]

Noda et al.

[11] Patent Number: 5,623,390
[45] Date of Patent: Apr. 22, 1997

[54] COMPUTER HAVING NICKEL-HYDROGEN BATTERY AND VENT HOLES SEALED WITH POROUS FILM

[75] Inventors: Hideaki Noda, Tamayama-mura; Hitoshi Funaki, Morioka; Naoyoshi Sainokami, Tamayama-mura, all of Japan

[73] Assignee: Alps Electric Co., Ltd., Tokyo, Japan

[21] Appl. No.: 673,696

[22] Filed: Jun. 25, 1996

Related U.S. Application Data

[62] Division of Ser. No. 353,656, Dec. 9, 1994, Pat. No. 5,583,742.

[30] Foreign Application Priority Data

| Dec. 15, 1993 | [JP] | Japan | 5-315218 |
| Dec. 15, 1993 | [JP] | Japan | 5-315220 |
| Dec. 15, 1993 | [JP] | Japan | 5-315221 |

[51] Int. Cl.⁶ .................. H05K 5/00; H01M 10/52
[52] U.S. Cl. .................. 361/679; 361/683; 429/34; 429/57
[58] Field of Search .................. 361/679–683; 429/12, 34, 35, 57, 72

[56] References Cited

U.S. PATENT DOCUMENTS

| 4,572,724 | 2/1986 | Rosenberg et al. | 55/159 |
| 5,002,184 | 3/1991 | Lloyd | 206/305 |
| 5,387,477 | 2/1995 | Cheiky | 429/26 |
| 5,430,607 | 7/1995 | Smith | 361/683 |

*Primary Examiner*—Leo P. Picard
*Assistant Examiner*—Jayprakash N. Gandhi
*Attorney, Agent, or Firm*—Guy W. Shoup; Patrick T. Bever

[57] ABSTRACT

A computer including a body case housing a display, an outer member formed of an impact-resistant material integrally formed on the outside surface of the body case, and an outwardly-projecting cushioning portion formed at each corner of the outside member. Each of the cushioning portions has a first protective portion extending outwardly from the body case, and a second protective portion projecting curvilinearly with respect to the first protective portion and extending onto a surface or a back side of the body case. The cushioning portions are formed of an elastic material. Further, vent holes are formed in the body case which are sealed with a porous film which is permeable to gas but not permeable to water. The vent holes provide an escape path for gas produced by a battery, such as a nickel-hydrogen battery, in the event that the battery explodes within the body case.

2 Claims, 7 Drawing Sheets

FIG. 11
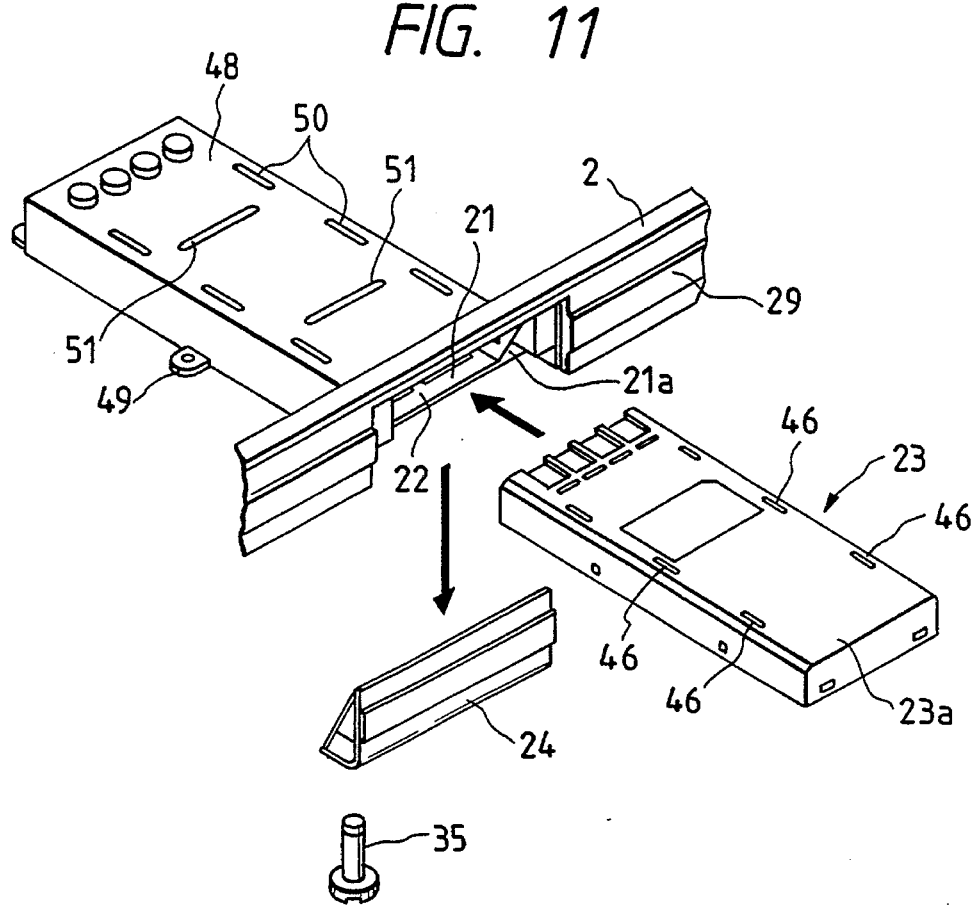
FIG. 12
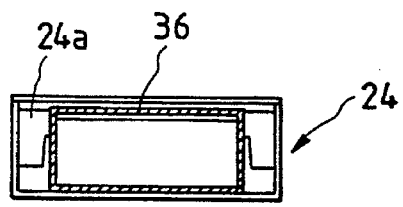
FIG. 13(a)    FIG. 13(b)    FIG. 13(c)
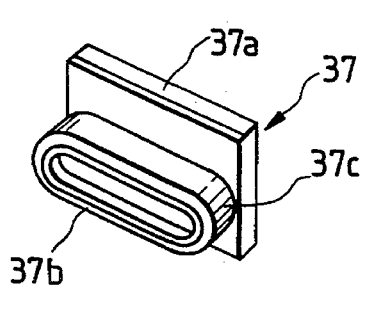 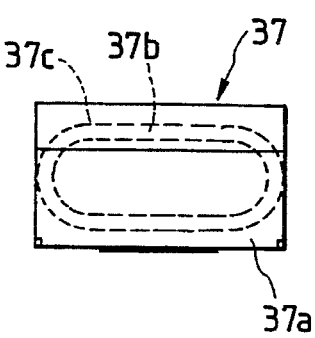 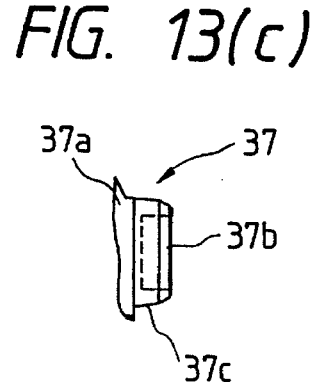

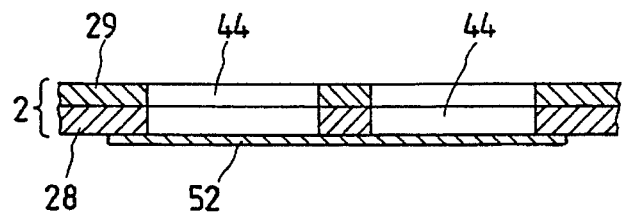
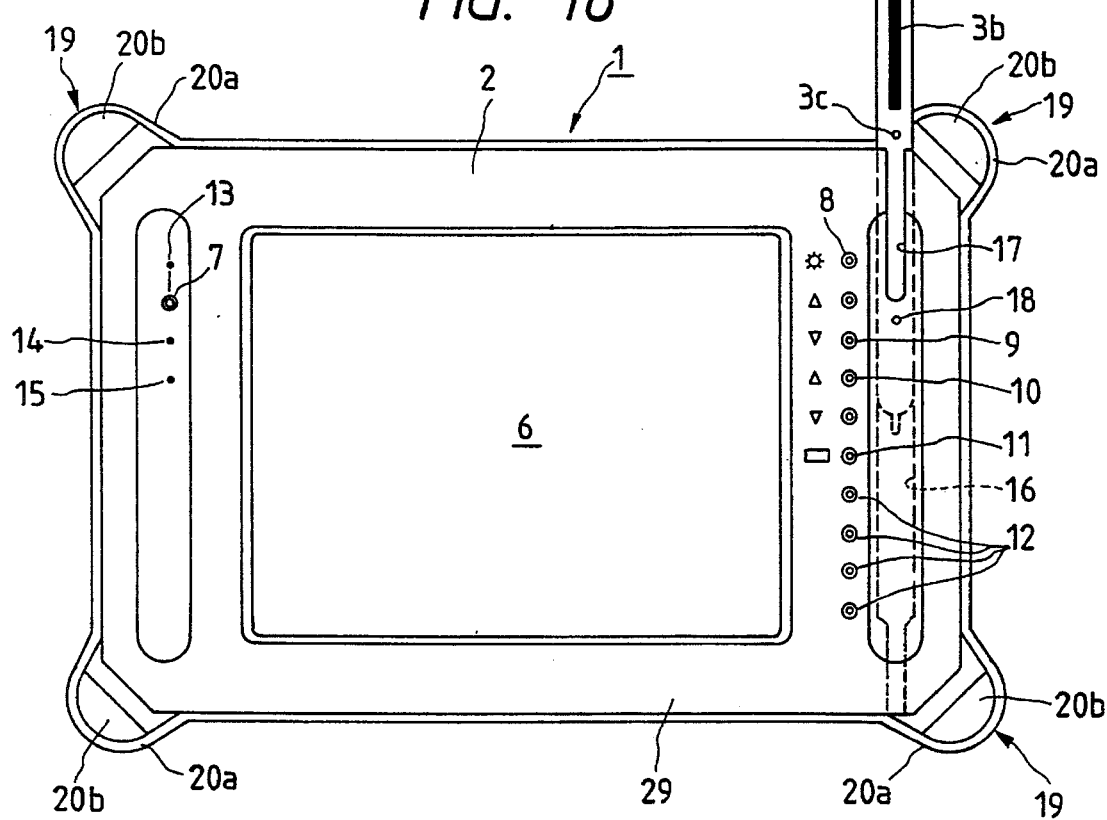
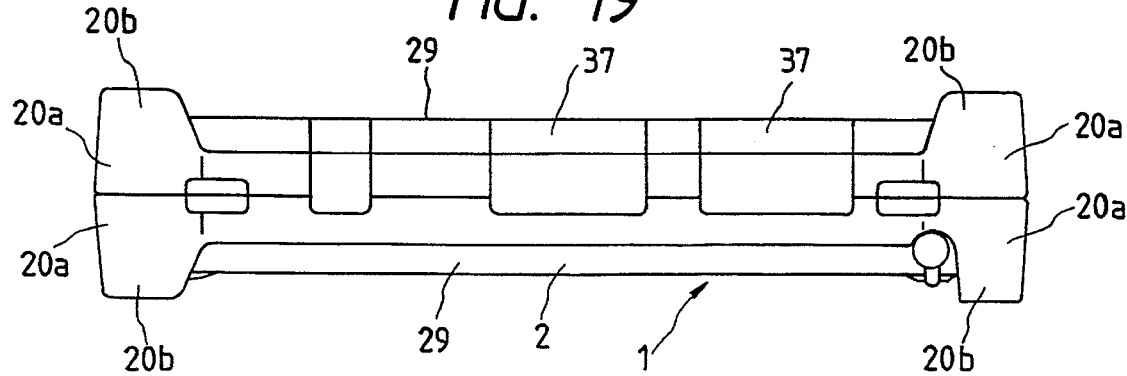

COMPUTER HAVING NICKEL-HYDROGEN BATTERY AND VENT HOLES SEALED WITH POROUS FILM

This application is a division of application Ser. No. 08/353,656, filed Dec. 9, 1994 now U.S. Pat. No. 5,583,742.

BACKGROUND OF THE INVENTION (1) Field of the Invention

The present invention relates to a computer and more particularly to a computer capable of being used while retaining high reliability even in such an environment as outdoor environment or the like.

(2) Description of the Related Art

Heretofore, personal computers have widely been used for performing various calculations, and a portable, small-sized computer has recently been developed.

In such a small-sized computer, however, since extremely precise electronic components are incorporated therein, its impact resistance is very low, and when impact is exerted on the computer, for example, by dropping from a desk or the like or collision with something, the computer will be damaged, causing malfunction or inoperative state.

Generally, in computers used for various information processings, electronic devices incorporated therein are easily effected by humidity, so such computers are used in a less humid environment.

In recent years, however, there has been an increasing necessity of performing information processings using computers in bad, outdoor working environments such as, for example, construction work site and engineering work site. In such outdoor environments, however, it is very likely that there will occur dropping, etc. of the computers, so it has been necessary to protect the computers positively.

In the case of using a computer in an outdoor place exposed to rain water, a special booth for shielding the computer from rain water has heretofore been installed at the work site and the computer has been used within such special booth. However, the installation of such special booth is very expensive and requires a large installing space, so its installation has so far involved a great deal of trouble.

According to the prior art, in view of such inconvenience, the whole of a computer is put into a protective case which is provided as an optional item for example to protect the computer from external shock, etc.

According to the prior art, moreover, when waterproofness is to be ensured, a computer is used in a wholly covered state using a waterproof cover such as a transparent resin sheet or the like.

However, the above method of accommodating a computer within a protective case involves the problem that it is impossible to operate the computer as housed within the protective case.

It is possible to form an opening in part of the protective case so that the computer as housed within the case can be operated. Even in this case, however, it is extremely difficult to ensure a safe operability. Moreover, even if impact resistance is improved by the protective case, the entire size will become extremely large and thus the use, especially outdoor use, is very inconvenient. Further, in a received state within the protective case, the interior of the case will be filled with heat generated from the computer, thus giving rise to the problem that electronic components, etc. of the computer are badly influenced.

According to the conventional means adopted for solving the aforementioned problems, an impact-resistant member is mounted replaceably, or fixed using an adhesive or the like, at each corner portion of the computer body case. However, in the use of such conventional computer protecting means using a replaceable impact-resistant member, it is necessary to provide such impact-resistant member separately, thus resulting in increase in the number of components and increase of the material cost. Besides, the space for mounting such impact-resistant member is required inside the computer body case, thus obstructing the attainment of the reduction in size of the body case. Further, since the impact-resistant member is mounted in a replaceable manner, the mounting strength of the impact-resistant member with respect to the body case may be insufficient, causing disengagement of the impact-resistant member from the body case, and thus it is impossible to ensure protection of the computer. Additionally, the use of some impact-resistant member mounting means may result in difficulty in retaining the waterproofing function of the computer body case.

In the case of the foregoing computer protecting means which uses an adhesive or the like for fixing the impact-resistant member to the computer body case, the durability of the impact-resistant member will be deteriorated markedly if the bonding strength of the adhesive used is insufficient. Besides, some impact exerting direction may give rise to a difference in impact resistance, thus making it impossible to ensure the protection of the computer. Further, since an adhesive applying step is required, the number of manufacturing steps increases, thus resulting in increase of the manufacturing cost.

In the case of using a waterproof cover, the rupture of the same cover is very likely to occur and thus the waterproofness of the computer cannot be ensured to a satisfactory extent. Besides, the information inputting operation, etc. through such waterproof cover are inconvenient and thus the working efficiency is very poor.

Under such circumstances, it has been desired to develop a computer which is employable even in bad working environments.

For making a computer portable, it is necessary to use a battery which is small in size but can work long. As a battery which satisfies this condition there is known a nickel-hydrogen battery for example. This type of a battery is formed so as to permit leakage of an explosive gas such as hydrogen gas to the exterior through an explosion-proof valve upon occurrence of a trouble. Therefore, in the case of using a battery which generates such explosive gas, it may be suitable to mount the battery outside the computer case. In this case, however, the battery is apt to be disengaged from the computer case due to low vibration resistance thereof upon imposition thereon of a large shock such as dropping of the computer. Moreover, the electrodes of the battery are apt to become rusty, and also from the standpoint of waterproofness, its attainment is difficult. Further, since the battery is exposed, the appearance is not good.

SUMMARY OF THE INVENTION

The present invention has been accomplished in view of the above-mentioned points and it is an object of the invention to provide a computer which is employable while retaining high reliability even in an outdoor environment and the like.

It is another object of the present invention to provide a computer capable of being remarkably improved in its impact resistance and the whole of which can be surely protected from shock applied thereto due to dropping or the like outdoors.

It is a further object of the present invention to provide a computer highly waterproof, strong against rain water and capable of retaining high reliability of operation even in a bad working environment.

It is a still further object of the present invention to provide a waterproof computer capable of incorporating a battery in a case which battery generates an explosive gas in the event of occurrence of a trouble, and capable of retaining safety in the interior of the case even in the event of evolution of such explosive gas.

It is a still further object of the present invention to provide a computer wherein a display is disposed in a body case, an outer cover formed of an impact-resistant material is mounted outside the body case, and an outwardly projecting cushioning portion is formed integrally with each corner portion of the outer cover.

It is a still further object of the present invention to provide a computer having a waterproof structure for the whole of portions which are easily effected by water.

It is a still further object of the present invention to provide a computer wherein a battery which evolves an explosive gas upon occurrence of a trouble is disposed within a body case in an air- and liquid-tight manner, the body case also serves as a primary receptacle portion for the explosive gas evolved from the battery, and vent holes formed in the body case are sealed with a porous film which is permeable to gas but not permeable to water.

In the computer according to the present invention, cushioning portions formed of an impact-resistant material are integral with the corner portions of the outer cover, so when shock is imposed on the computer case body, for example upon drop of the case body by mistake, the cushioning portions are the first to collide with the floor to absorb the shock, whereby the destruction of the body case and internal devices can be prevented and hence it is possible to protect the computer positively. Further, since the cushioning portions are integral with the cover corner portions, it is not necessary to separately provide the impact-resistant member or adopt an adhesive applying step, that is, an easy and less expensive production can be attained. Additionally, a stable impact resistance can be obtained independently of the mounting strength and bonding strength.

According to the present invention, moreover, since the whole of the portions effected easily by water such as the incorporated electronic devices, etc. is waterproofed by a waterproof structure, the electronic devices, etc. can be shielded positively from rain water and the like. Thus, the computer of the invention can be used while retaining high reliability of operation even in a bad working environment.

Further, according to the present invention, in the event an explosive gas is evolved from the battery which is contained in a waterproof manner within the body case, the explosive gas is constrained primarily within the body case, then passes through a porous film and vent holes and is discharged to the exterior of the body case, whereby the concentration of the explosive gas in the body case is sure to be maintained within the range of safety standard.

BRIEF DESCRIPTION OF THE DRAWINGS

FIG. 11 is an exploded perspective view showing a battery mounting portion of the computer illustrated in FIG. 1;

FIG. 12 is a front view showing an inner surface of a battery cover;

FIG. 13($a$) is a perspective view of a connector cover, FIG. 13($b$) is a front view showing an outer surface portion thereof, and FIG. 13($c$) is a right side view of FIG. 13($b$);

FIG. 17 is an enlarged sectional view taken along line D—D in FIG. 3, with the internal mechanism omitted;

FIG. 18 is a front view of a computer according to a second embodiment of the present invention; and FIG. 19 is a plan view showing a connector cover and jack cover mounted state of the computer shown in FIG. 18.

DETAILED DESCRIPTION OF THE PREFERRED EMBODIMENTS

Figure 1:
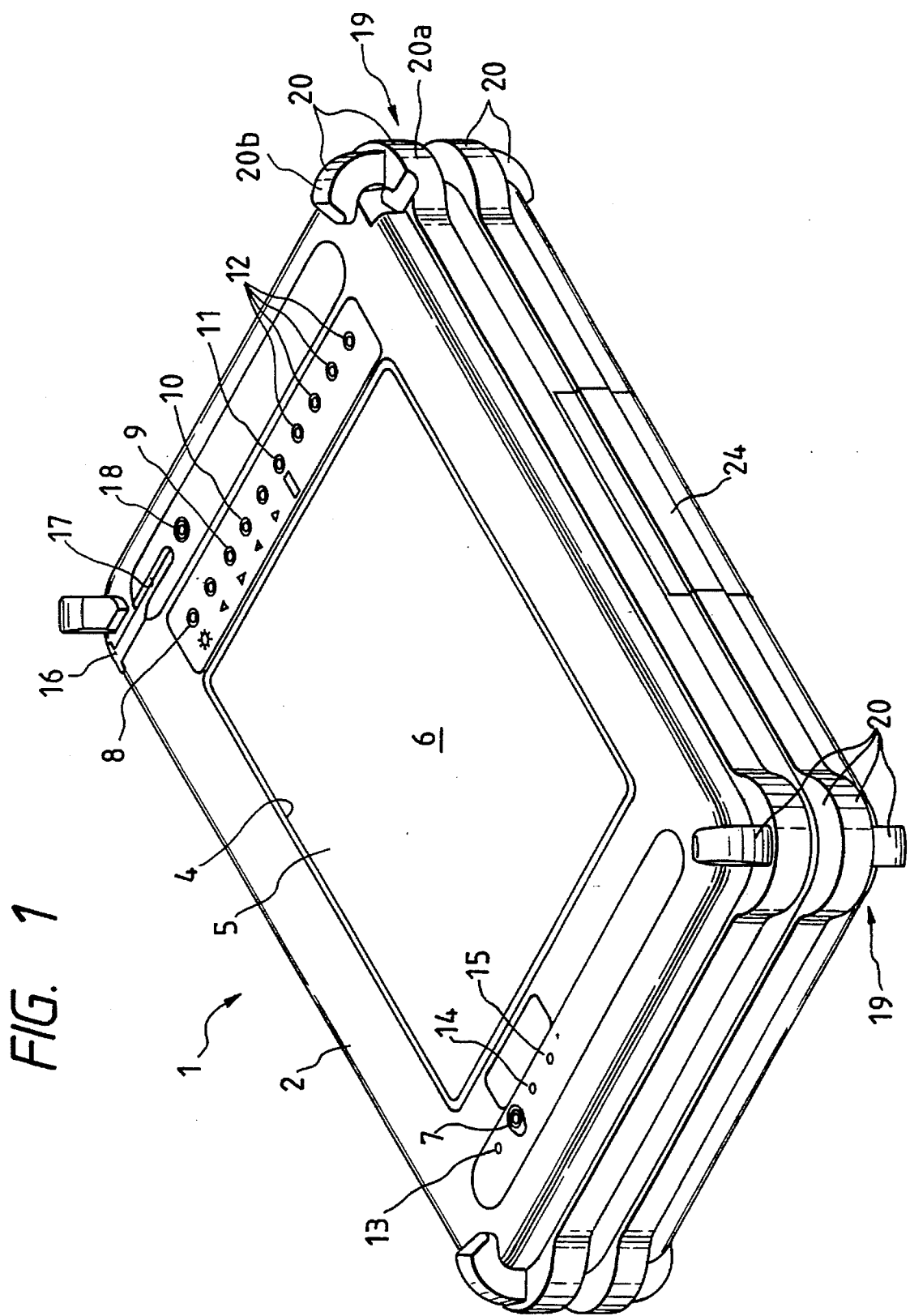
FIG. 1 is a perspective view showing an appearance of a computer according to a first embodiment of the present invention.
Figure 2:
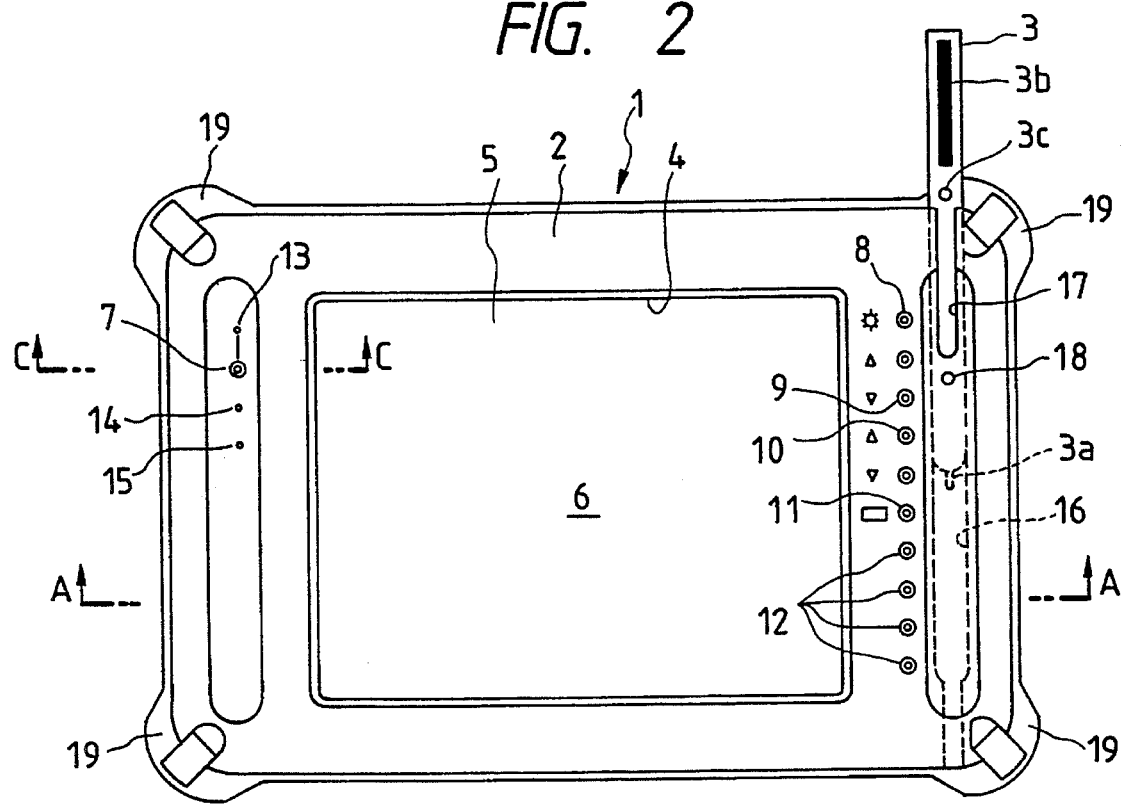
FIG. 2 is a front view of the computer shown in FIG. 1.
Figure 3:
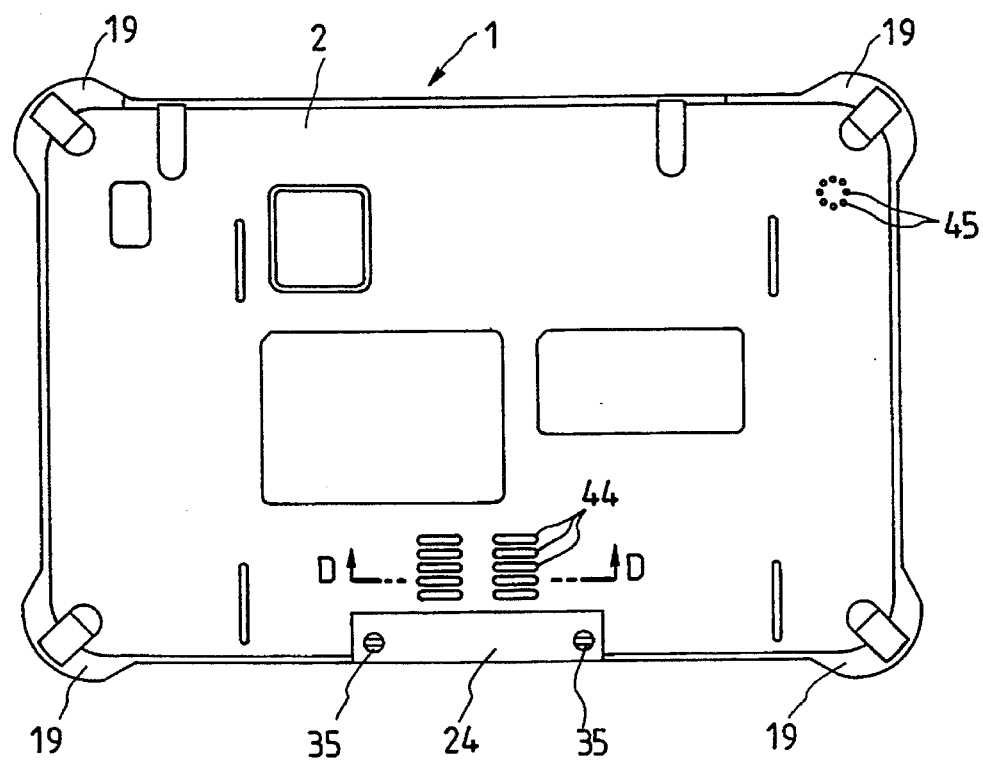
FIG. 3 is a rear view of the computer shown in FIG. 2.

Embodiments of the present invention will be described in detail hereinunder with reference to the accompanying drawings.

FIGS. 1 to 17 illustrate a pen computer 1 which performs various operations using a pen, according to a first embodiment of the present invention.

The pen computer 1 is formed in such a manner that various constituent devices necessary for the computer are incorporated within a portable body case 2 which is generally in the shape of a flat, rectangular parallelepiped and that various information operations can be done using an operating pen 3.

More specifically, a generally rectangular opening 4 is formed centrally of the front face of the body case 2, and inside the opening 4 is mounted a display 6 which is, for example, a liquid crystal panel having an information inputting tablet at the top thereof. On both right and left side portions of the front display 6 of the body case 2 are disposed switches adapted to be turned ON and OFF upon depression thereof by an operating projection 3$a$ at the tip of the operating pen 3$a$, which switches are power switch 7, a back light switch 8 for the display 6, a bright switch 9 for the display, a contrast switch 10, a keyboard switch 11 for displaying and operating a keyboard (not shown) on the display 6, and function switches 12. Near the power switch 7 are disposed a power lamp 13 for indicating whether the power source is ON or OFF, a battery lamp 14 for indicating the state of charging of a battery 23 which will be described later, and a thermolamp 15 for indicating the internal temperature of the body case 2. At the rightmost portion of the front of the body case 2 is formed a pen receptacle portion 16 for receiving the operating pen 3 therein, the pen receptacle portion 16 being formed as a vertical through hole. In the pen receptacle portion 16 is formed a holding slit 17 for engagement therewith of a swivel-stop projection 3b of the operating pen 3 and is also formed an engaging recess 18 for engagement therewith of a holding projection 3c of the pen 3 to prevent drop-out of the pen.

At the four corners of the body case 2 are provided cushioning portions 19 formed of an elastic material for protecting the body case 2 and internal devices from shocks such as dropping and collision. Each cushioning portion 19 comprises protective protuberant portions 20, 20, each protective protuberant portion 20 comprising an expanded protective portion 20a expanded outwards from the outer surface of a corner portion of the body case 2 and a projecting protective portion 20b projecting curvilinearly from the surface of the expanded protective portion 20a and extending onto the surface or the back of the body case 2. In the event of fall to the ground for example, the protective protuberant portions 20, 20 are the first to collide with the ground and absorb the resulting shock, thereby preventing destruction of the body case 2 and internal devices.

In the bottom of the body case 2 is formed an insertion opening 22 for a battery receptacle portion 21. A battery 23 is inserted into the battery receptacle portion 21 through the insertion opening 22 and is sealed therein with a battery cover 24.

At the plane portion of the body case 2, two connectors 25, 25 for connection cables (not shown) with external devices are arranged in parallel right and left and in an exposed state. Further, a power jack 26 for a connection cable (not shown) with an external power source is disposed adjacent to one connector 25 and in an exposed state. Adjacent to the other connector 25 is formed a through hole 27 for option which permits connection between the internal devices in the body case 2 and external devices.

In the back of the body case 2 are formed a large number of vent holes 44, 44, . . . for the discharge of gas evolved from the battery 23 in the event of some trouble to the exterior of the case, as well as through holes 45, 45 for voice which are for discharging the voice from a speaker (not shown) to the exterior.

Figure 7:
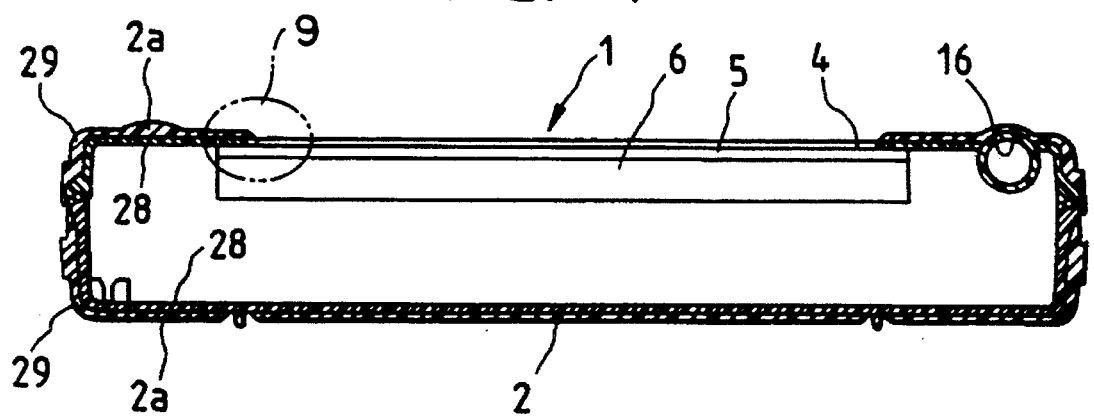
FIG. 7 is an enlarged sectional view taken along line A—A in FIG. 2, with the internal mechanism omitted.

As shown in FIG. 7, the body case 2 is divided in its side portion into two divided cases 2a, 2a, each divided case having a duplex structure comprising an inside member 28 made of a synthetic resin and an outside member 29 which covers the outside of the inside member.

It is desirable that the material of the inside member 28 have rigidity sufficient to mount thereto such components as printed circuit boards hard disc unit and LCD which are required for the pen computer 1, undergo little change in its physical properties even upon change in temperature, be capable of undergoing such treatments as plating and vapor deposition, and be capable of ensuring a sufficient strength of adhesion to each outside member 29. For example, said material is a thermoplastic resin such as PC (polycarbonate) or PC-ABS (polycarbonate-ABS resin).

The material of each outside member 29 preferably undergoes little change in its physical properties even upon change in temperature, can ensure a sufficient strength of adhesion to each inside member 28 and possesses elasticity which permits the material to be molded easily into a desired shape. For example, it is such a shock absorbing material as olefin elastomer, urethane elastomer (e.g. urethane rubber), butyl rubber, or silicone rubber.

In this embodiment, since the body case 2 has such a structure, the pen computer 1 can be given not only sufficient impact resistance but also waterproofness.

In this embodiment, moreover, there is adopted the following structure in order to make completely waterproof the whole of the pen computer portions which are easily effected by water.

Figure 8:
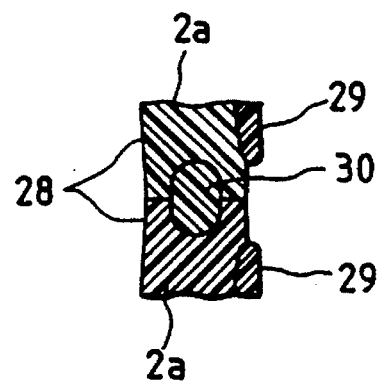
FIG. 8 is an enlarged sectional view of a connected portion of divided halves of a body case.

First, as shown in FIGS. 7 and 8, waterproofness of the connection between the divided cases 2a and 2a is attained by holding therebetween an endless packing 30 which is formed of silicone rubber for example.

Figure 9:
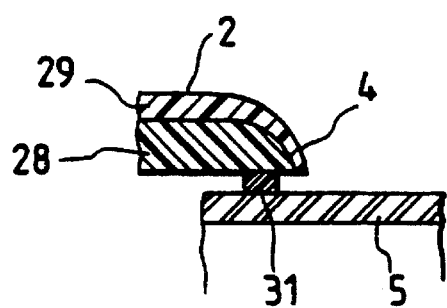
FIG. 9 is an enlarged view of portion B shown in FIG. 7.

Waterproofness between the plane portion of the body case 2 and the tablet 5 of the display 6 is attained in the following manner. As shown in FIGS. 7 and 9, a waterproof member 31 capable of undergoing compressive deformations, such as sponge tape, is attached to the inner surface of the body case 2 along the peripheral edge of the opening 4, using an adhesive or the like, then at the time of assembly, the waterproof member 31 is held grippingly so as to be deformed compressively by both body case 2 and tablet 5. Sponge tape as an example of the waterproof member 31 is porous so undergoes compressive deformation easily; besides, when compressed so as to reduce its thickness, it exhibits an extremely high waterproofness. Thus, sufficient waterproofness is ensured by merely keeping the tablet 5 and the sponge tape as the waterproof member 31 in close contact with each other under pressure without bonding. Consequently, at the time of operation of maintenance such as replacement of the display 6, the display and the body case 2 can be easily separated from each other, thus proving superiority also in point of maintenance. If a deformable, soft sponge tape is used as the waterproof member 31, then even in the case of slight deformation of the body case 2 upon imposition of a shock thereon, the sponge tape can follow such deformation, so that it is possible to prevent the occurrence of a crack or the like in the inside member 28 which ensures rigidity of the body case 2. As to the material of the waterproof member 31, there may be used any material if only it has deformability and waterproofness similar to those of a sponge tape. For example, a soft rubber may be used.

Figure 10:
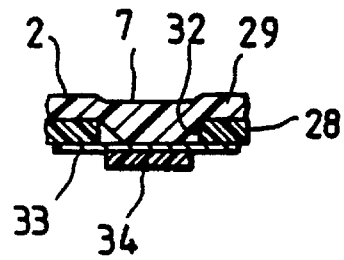
FIG. 10 is an enlarged sectional view taken along line C—C in FIG. 2, with the internal mechanism omitted.

In the switch portion including the power switch 7, as shown in FIG. 10, a through hole 32 is formed in the inside member 28 of the body case 2, then the through hole 32 is sealed by affixing a thin waterproof sheet 33 to the inner surface of the inside member 28, thereby ensuring waterproofness, and a membrane switch 34 is disposed inside the waterproof sheet 33. The membrane switch 34 is turned ON and OFF by pushing it with the operating projection 3a of the operating pen 3 through the through hole 32 and through both outside member 29 and waterproof sheet 33. The through hole 32 itself has waterproofness sufficient to withstand on-off operation of, for example, ten thousand times through one outside member 29, but a still higher waterproofness can be attained by using the waterproof sheet 33.

Figure 4:
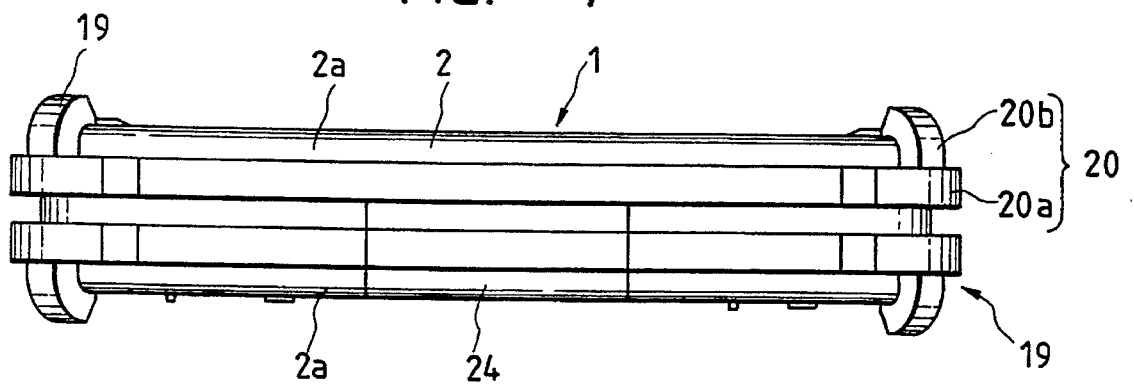
FIG. 4 is a bottom view of the computer shown in FIG. 2.

In the portion of the battery 23 which is replaced as necessary, the battery cover 24 is fixed to the body case 2 with two set-screws 35, 35 so that the battery having a relatively large weight may not jump out from the battery receptacle portion 21 of the body case 2, as shown in FIGS. 4, 11 and 12. In order to attain waterproofness of this portion, an endless packing 36 formed of a silicone rubber or the like is attached to an inner surface 24a of the battery cover 24 which is opposed to a front end face 21a of the battery receptacle portion 21, and then the set-screws 35 are tightened to hold the packing 36 grippingly by both faces 21a and 24a.

Figure 5:
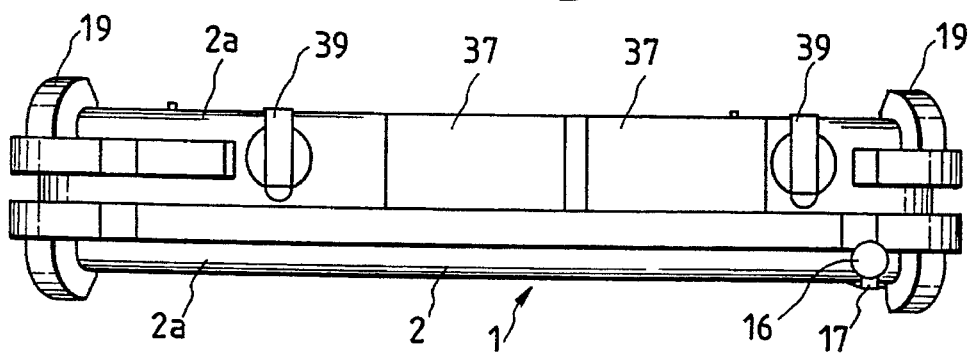
FIG. 5 is a plan view showing a connector cover and jack cover mounted state of the computer illustrated in FIG. 1.
Figure 6:
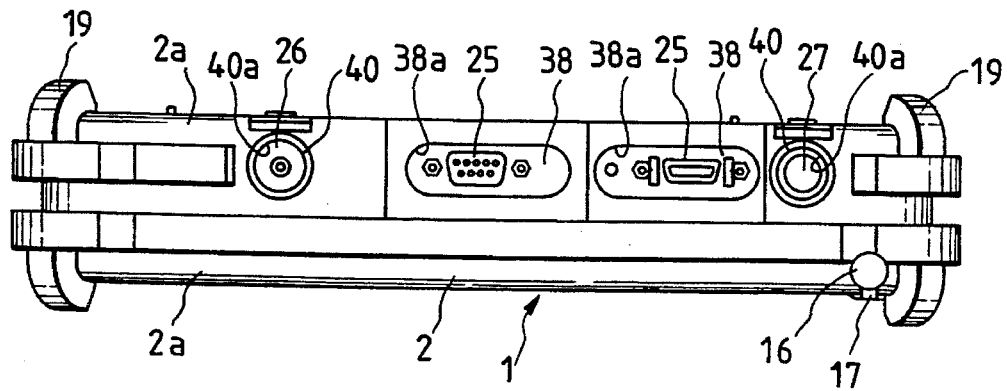
FIG. 6 is a plan view showing a connector cover and jack cover removed state of the computer illustrated in FIG. 1.

In the portion of the connector 25, as shown in FIGS. 5, 6 and 13, the connector 25 is exposed from the outside member 29, and a mounting hole 38 having an elliptical inner peripheral surface 38a is formed in the outside member to permit a connector cover 37 to be press-fitted therein. The connector cover 37 is formed by molding integrally from the same elastic material as that of the outside member 29. The connector cover 37 comprises a rectangular lid portion 37a and a projecting, annular press-fit portion 37b formed on the inner surface of the lid portion 37a and having an elliptical outer peripheral surface 37c, the portion 37b being press-fitted into the mounting hole 38. The allowance for press-fitting between the elliptical outer peripheral surface 37c and inner peripheral surface 38a may be in the range of 0.3 to 0.5 mm on one side if the elastic material used is EPDM (ethylene-propylene-diene terpolymer). In the case where the connectors 25 are not used in this embodiment, waterproofness of the connector portions can be attained by press-fitting the projecting portion 37b of the connector cover 37 into the mounting hole 38. By forming the projecting press-fit portion 37b and the mounting hole 38 into an angle-free shape such as an ellipse or a circle as in this embodiment, the press-fit portion 37b can be deformed so as to collapse uniformly throughout the whole circumference thereof to exhibit perfect waterproofness.

Figures 14A, 14B, 14C:
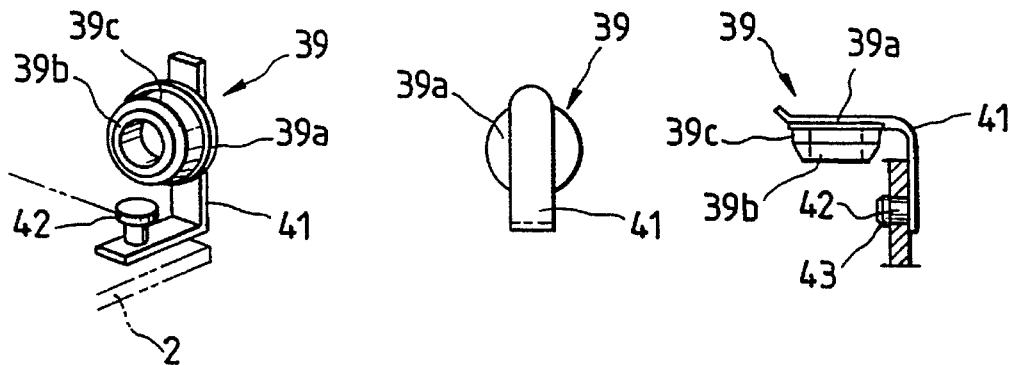
FIG. 14($a$) is a perspective view of a jack cover, FIG. 14($b$) is a front view showing an outer surface portion thereof and FIG. 14($c$) is a right side view of FIG. 14($b$)

In the portions of the jack 26 for power supply and the through hole 27 for option, as shown in FIGS. 5, 6 and 14, the jack 26 and the through hole 27 are exposed from the outside member 29 of the body case 2, and mounting holes 40 each having a circular inner peripheral surface 40a for press-fitting therein of a jack cover 39 are formed in the outside member. The jack cover 39, which is formed by molding integrally from the same elastic material as that of the outside member 29, comprises a circular lid portion 39a and a projecting, annular press-fit portion 39b having a circular outer peripheral surface 39c, the projecting portion 39b being press-fitted into the mounting hole 40. The allowance for press-fitting between the circular outer peripheral surface 39c and inner peripheral surface 40a may be set in the range of 0.3 to 0.5 mm on one side if the elastic material used is EPDM like the connector portion. In this embodiment, in order to ensure the attachment of the jack cover 39 to the body case 2, a bellows 41 for connection is extended from the lid portion 39a and an engaging projection 42 formed at the front end portion of the bellows 41 is fitted into a mounting hole 43 formed in the back of the body case 2, then fixed by bonding or the like, to attain waterproofness of the mounting portion. In the case where the jack 26 for power supply and the through hole 27 for option are not used in this embodiment, waterproofness of these jack and through hole portions is attained by press-fitting the projecting portion 39b of the jack cover 39 into each mounting hole 40.

Figure 15:
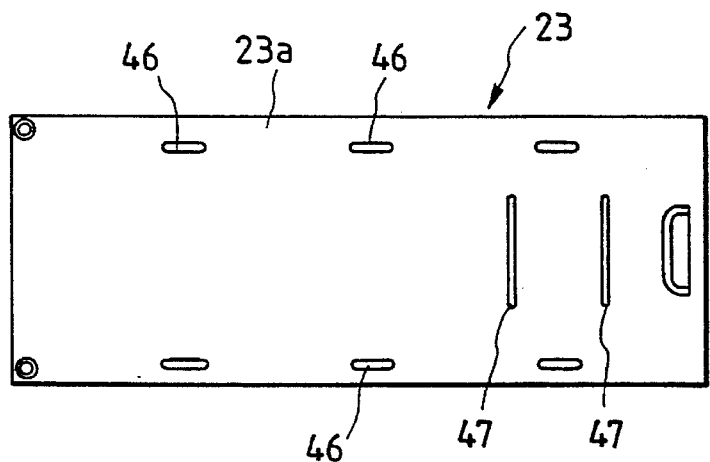
FIG. 15 is a bottom view of a battery.
Figure 16:
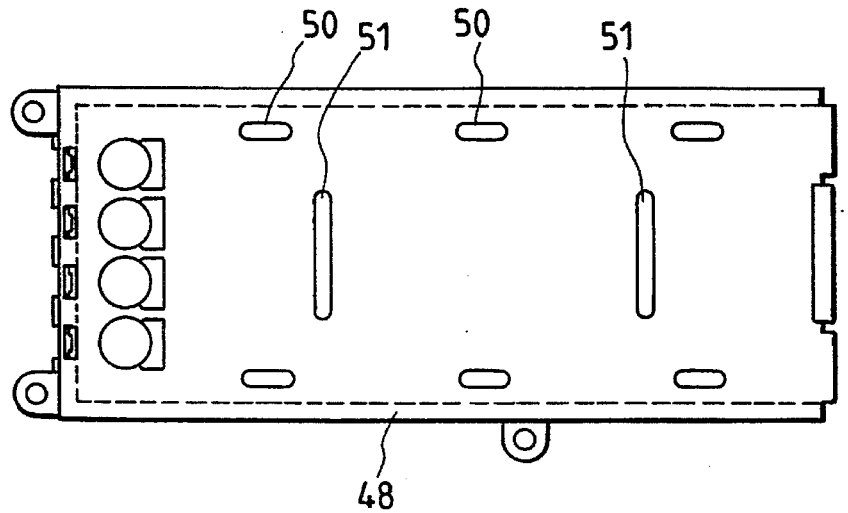
FIG. 16 is a top view of a body inside cover.

The battery 23 portion whose waterproofness is attained in the above manner will now be described in more detail. The battery 23 used in this embodiment is a nickel-hydrogen battery, and as shown in FIGS. 11 and 15, a total of twelve, longitudinally long vent holes 46 are formed at right and left portions in the upper and lower surfaces of a cover case 23a. Further, two laterally long vent holes 47, 47 are formed in the lower surface. The battery receptacle portion 21 is formed in the shape of a tunnel having a rectangular section and whose inner part is closed. This is attained by fixing a body inside cover 48 to the inner surface of the body case 2 with set-screws 49, the body inside cover 48 being in the shape of a box having an open side portion for insertion of the battery 23 therein, as shown in FIG. 16. For conducting an explosive gas evolved from the battery 23 in the body case 2, the body inside cover 48 has six longitudinally long communication holes 50 formed in positions opposed to the vent holes 46 formed in the upper surface of the battery 23. Further, two, laterally long communication holes 51, 51 are formed in the body inside cover 48. The laterally long vent holes 44 formed ten in the back of the body case 2 are located in positions substantially opposed to the laterally long vent holes 47 formed in the lower surface of the battery 23. The portion of the vent holes 44 functioning as opening for discharging an explosive gas from the body case 2 to the exterior and the portion of the through holes 44 for voice are sealed with a porous film 52 which is permeable to gas but not permeable to water, to attain waterproofness, as shown in FIG. 17.

A suitable degree of waterproofness of each constituent portion in this embodiment may be decided according to working conditions, etc. of the pen computer 1. For example, it can be decided in accordance with the contents of IEC525 SPEC. IPX4 "Protection against Water Spray" which defines waterproofness test standards.

The operation of this embodiment will be described below.

When a shock is applied to the body case 2 of the pen computer 1, for example when the body case is dropped to the ground by mistake, the expanded protective portion 20a or the projecting protective portion 20b, as a constituent of each cushioning portion 19, first strikes against the ground to absorb the shock, whereby the destruction of the body case 2 and that of the internal devices can be prevented.

In this case, by suitably combining materials of the inside members 28, 28 and outside members 29, 29 and by selecting a material hardness of the outside members 29, 29 in the range of about 50 to 80 HA, a percent shock absorption represented by the following equation can be ensured in the range of about 20% to 80%:

$$\text{Percent Shock Absorption (\%)} = 1 - \frac{\text{Impact acceleration in the presence of a shock absorbing material}}{\text{Impact acceleration in the absence of a shock absorbing material}} \times 100$$

In this case, a repulsive coefficient is 0.5 or less, and even when the body case 2 of the pen computer 1 is dropped from a desk or the like having a height of 70 cm or so, the case can withstand the resulting shock.

Thus, in this embodiment, since the cushioning portion 19 comprising the expanded protective portion 20a and the projecting protective portion 20b is formed integrally with each corner portion of each outside member 29, in the event a shock is applied to the body case 2 of the pen computer 1, the shock can surely be absorbed by the protective portions 20a and 20b, whereby it is made possible to prevent destruction of the body case 2 and internal devices and protect the pen computer 1 positively. Further, since the cushioning portion 19 is formed integrally with each outside member corner portion, it is not necessary to provide an impact-resistant member separately or adopt an adhesive applying step, unlike the prior art, thus permitting easy and less expensive production. Besides, it is possible to attain a stable impact resistance independently of the mounting strength, bonding strength, etc.

In this embodiment, moreover, since the whole of the portions which are easily effected by water, such as the electronic devices incorporated in the body case 2, is waterproofed completely by the foregoing waterproof structure, the electronic devices, etc. can be shielded positively from rain water, and hence the pen computer 1 can be used while retaining high reliability of its operation even in a bad working environment.

According to this embodiment, in the event some trouble occurs in the battery 23 which is a nickel-hydrogen battery and hydrogen gas as an explosive gas is discharged from the vent holes 46 and 47 of the cover case 23a, the hydrogen gas once flows into the body case 2 through the communication holes 50, 51 of the body inside cover 48. At this time, since the vent holes 46 on the upper surface side of the battery 23 and the communication holes 50 of the body inside cover 48 are in a facing relation to each other, the hydrogen gas flows into the body case 2 smoothly without staying within the cover 48 to prevent the hydrogen gas concentration in the cover 48 from reaching an explosive concentration of 4 vol. %. Further, the hydrogen gas which has entered the body case 2 is discharged to the exterior through the vent holes 44 and through holes 45 for voice to prevent the hydrogen gas concentration in the body case 2 from reaching the explosive concentration of 4 vol. %. At this time, the discharge of the hydrogen gas to the exterior is effected smoothly because the vent holes 44 of the body case 2 are formed in positions opposed to the vent holes 47 on the lower surface side of the battery 23.

According to this embodiment, when there was used a nickel-hydrogen battery which discharged hydrogen gas in an overcharged state of the battery or at an outside air temperature of 0° C. or below, and when the vent holes 44 of the body case 2 were each set at a size of 2×13 mm, the vent holes 46 and 47 in the cover case 23 of the battery 23 were set at sizes of 1.5×8 mm and 1×20 mm, respectively, the communication holes 50 and 51 of the body inside cover 48 were set at sizes of 2.5×8 mm and 2×20 mm, respectively, and the gas permeability of the porous film 52 was set at 0.8 (cc/cm$^2$·sec), the hydrogen concentrations in the cover case 23a, in the body inside cover 48 and in the body case 2 could be kept to values not larger than 3 vol. %.

The following description is now provided about a second embodiment of the present invention.

According to this second embodiment, as illustrated in FIGS. 18 and 19, cushioning portions 19 are provided at four corner portions of each outside member 29 of the body case 2. Each cushioning portion 19 comprises an expanded protective portion 20a expanded outwards from the outer surface of each corner portion of each outside member 29 and a projecting protective portion 20b projecting from the surface of the expanded protective portion 20a, both protective portions 20a and 20b being formed integrally with the outside member. The shape of the projecting protective portion 20b is modified. The other portions are the same as in the first embodiment described above, so are indicated by the same reference numerals as in the first embodiment and explanation thereof is here omitted.

Thus, also in this second embodiment, like the first embodiment, cushioning portions 19 each comprising such expanded protective portion 20a and projecting protective portion 20b are formed integrally with the corner portions of the outside members 29, 29, so when a shock is applied to the body case 2 of the pen computer 1, the shock can be absorbed positively by the expanded protective portions 20a or the projecting protective portions 20b, whereby the body case and the internal devices are prevented from destruction and hence the pen computer 1 can be surely protected. Further, since the cushioning portions 19 are formed integrally, not only easy and less expensive manufacture can be attained but also it is possible to attain a stable impact resistance.

The present invention is not limited to the above embodiments, but various modifications may be made as necessary.

In the computer of the present invention, as set forth above, cushioning portions are formed integrally with the corner portions of the body case outside members, so when a shock is exerted on the computer body case, the shock can be absorbed positively by the cushioning portions, so that it is possible to prevent destruction of the body case and the internal devices and thus the protection of the computer can be ensured. Further, because of such integral formation of the cushioning portions, it is not necessary to separately provide an impact-resistant member or adopt an adhesive applying step, unlike the prior art, and it is possible to effect manufacture easily and less expensively. Besides, it is possible to attain a stable impact resistance independently of the mounting strength, bonding strength, etc.

Moreover, by adopting the foregoing waterproof structure, the computer of the present invention can be made highly resistant to rain water and is made employable while retaining high reliability of its operation even in a bad working environment.

Further, in the computer having waterproofness according to the present invention, a battery which evolves an explosive gas in the event of some trouble can be incorporated within the case; besides, the interior of the case can be maintained safe even upon evolution of such explosive gas.

What is claimed is:

1. A computer comprising a body case incorporating a battery which produces an explosive gas during a malfunction event of the battery, the battery being sealed in a gas- and liquid-tight manner within the body case, said body case being used as a primary receptacle portion for the explosive gas produced from said battery, wherein vent holes are formed in the body case which communicate with the atmosphere and are sealed with a porous film which is permeable to gas but not permeable to water; and wherein said battery is a nickel-hydrogen battery.

2. A computer driven by a battery, characterized in that a battery receptacle portion for receiving said battery therein is formed within a body case, the interior of said body case is sealed in a gas- and liquid-tight manner against the exterior, an opening for outflow of an explosive gas evolved from said battery to the interior of said body case is formed in said battery receptacle portion, and vent holes are formed in the body case, said vent holes being sealed with a porous film which is permeable to gas but not permeable to water.

* * * * *